(12) United States Patent
Sato

(10) Patent No.: US 8,568,132 B2
(45) Date of Patent: Oct. 29, 2013

(54) INJECTION MOLDING APPARATUS WITH A HEATING UNIT AND A PUSHER SHAFT

(75) Inventor: Toshiomi Sato, Fujinomiya (JP)

(73) Assignee: Satoseiki Co., Ltd., Fujinomiya-Shi (JP)

( * ) Notice: Subject to any disclaimer, the term of this patent is extended or adjusted under 35 U.S.C. 154(b) by 59 days.

(21) Appl. No.: 13/281,961

(22) Filed: Oct. 26, 2011

(65) Prior Publication Data

US 2013/0108728 A1    May 2, 2013

(51) Int. Cl.
*B29C 45/72* (2006.01)

(52) U.S. Cl.
USPC ........... 425/547; 425/548; 425/550; 425/551; 425/556

(58) Field of Classification Search
USPC .......... 425/542, 547, 548, 550, 551, 554, 556
See application file for complete search history.

(56) References Cited

U.S. PATENT DOCUMENTS 2,551,439 A * 5/1951 Kovacs .......................... 425/568

FOREIGN PATENT DOCUMENTS

JP    A-2008-302634    12/2008

* cited by examiner

*Primary Examiner* — Tim Heitbrink
(74) *Attorney, Agent, or Firm* — Oliff & Berridge, PLC

(57) ABSTRACT

An output of heater means of a tube shaped heater device is set to melt a compound body P suitable for injecting it into a mold cavity. The conditions of temperature and the viscosity of the compound body P is adjusted in a through aperture suitably for theirs injection molding process. Upon descended a pusher shaft, the molten, compound body P is injected by the shaft into the gate and further into the cavity. After the compound body P reaches there, it solidified and changed to an article S.

10 Claims, 4 Drawing Sheets

INJECTION MOLDING APPARATUS WITH A HEATING UNIT AND A PUSHER SHAFT

FIELD OF THE INVENTION

The present invention relates generally to a molding device and an injection molding apparatus including the same.

BACKGROUND OF THE INVENTION

A molding device for injection molding an article is well known in the art as described in Japanese Laid-Open Public disclosure 2008-302634. The molding device is adapted to be used by incorporating the device into the injection molding apparatus comprising a heater device, a screw, and a control means for controlling the temperature of the heater device and/or the molding device.

In the operation of the injection molding apparatus including the molding device, a compound body, which is introduced from a hopper, may be heated and melted by the heater device, and delivered or injected by the screw into the mold cavity, and then an article is formed within the cavity. After the article is solidified, the mold cavity may be opened and pushed out the article therefrom by means of ejector pins.

During the above mentioned molding process, it is necessary to control precisely the temperature of the heater device and/or the mold so that provided are a plurality of temperature sensors and a control means for controlling on the basis of the information obtained through the sensors the temperature of the heater device and/or the molding device. It is necessary to change the parameters of the control means to each molding device exclusive for the article to be obtained.

Thus, the injection molding apparatus of the prior art is provided with a plurality of temperature sensors and a control means, and the parameters of the control means can be changed in accordance with the molding device to be used. In this connection, the injection molding apparatus must have a maximum performance to be imagined so as to satisfy the conditions to be set to the molding device to be used such as the highest injection pressure, the highest temperature, etc.

DISCLOSURE OF THE INVENTION

Problem or Problems to be Solved by the Invention

As can be seen from above, the injection molding apparatus of the prior art is complicated in its structure and expensive, so that it is necessary to produce good many amounts of articles for the depreciation of the apparatus.

Further, the parameters to be controlled such as the temperature should be set to the molding devices to be employed. It is necessary to make cumbersome setting operation every time when the molding devices to be incorporated are changed. This is the other problem of the injection molding apparatus.

An object of the present invention is to solve the above-mentioned problems by providing the molding device requiring no setting operation and the injection molding apparatus to which the device is to be incorporated.

The Means for Solving the Problem or Problems

There is provided a molding device including a mold body having a stationary molding member and a removable molding member defining a mold cavity therebetween; the molding device comprising:

a tube shaped heater device including a heater means for heating and melting a compound body, the heater means is connected at the one end thereof to the mold body so as to communicate with the mold cavity; and a connecting member connected to the other end of the heater device including an inlet hopper for introducing the compound body into the heater device;

wherein the heater device and the connecting member are fixedly connected to the mold body, wherein the heater device is adapted to be used only for the mold body, and wherein the heater means of the heater device is adapted to melt a compound body, and to heat the mold body to keep the condition of the melted compound body suitable for forming an article to be obtained.

Preferably, a heat transfer member is interposed between the tube shaped heater device and the mold body.

Preferably, a cooling means for cooling the connecting member is provided.

Preferably, a means for urging the compound body into the mold cavity is provided.

Effect to be Obtained from the Invention

In accordance with the invention, the simple and less expensive molding device and the injection molding apparatus to which the device is to be incorporated can be obtained so that it will be unnecessary to make cumbersome operation for setting the control parameters.

BRIEF DESCRIPTION OF THE DRAWINGS

Embodiments of the present invention will now be described more fully with reference to the accompanying drawings in which.

DETAILED DESCRIPTION OF THE INVENTION

Figure 1:
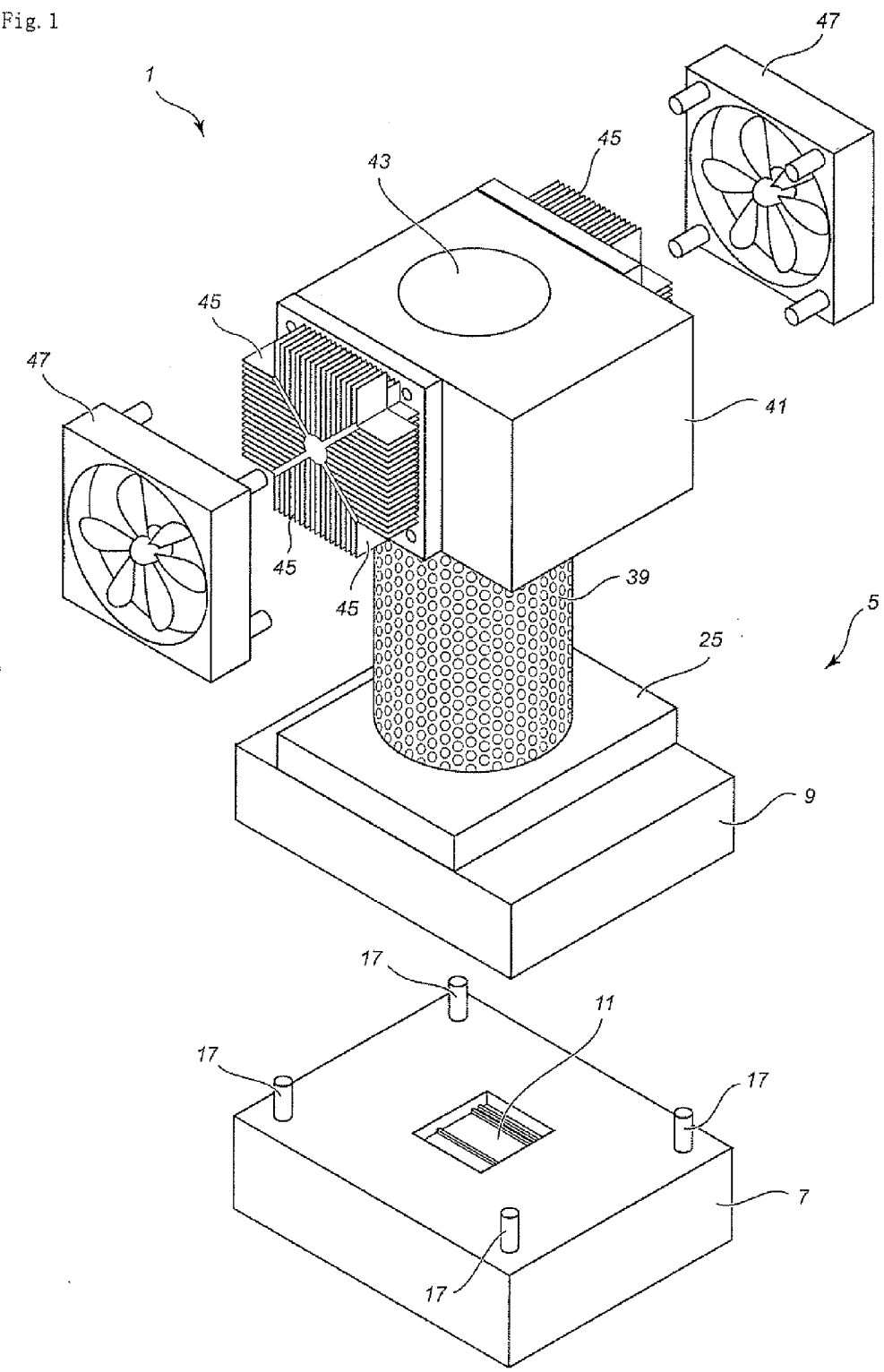
FIG. 1 is a perspective view illustrating a molding device of an embodiment of the present invention.

The molding device 1 in accordance with an embodiment of the present invention and the injection molding apparatus 3 to which the molding device is to be incorporated will now be described with reference to the attached drawings.

In the following description, a reference numeral 5 is added to a mold body including a stationary mold member 7 and a removable mold member 9. An upper surface of the stationary mold member 7 is provided with a recess 11 for forming a mold cavity. The stationary mold member 7 is provided on its upper surface with registration pins 17 at every corner.

A lower surface of removable mold member 9 is provided with a protrusion 19 for defining the mold cavity 23 with the recess 11 of the stationary mold member 7. At the central portion of the removable member 9, a through gate 21 for communicating with the mold cavity 23 is provided. The removable mold member 9 is also provided at every corner with registration holes (not shown) for mating with the registration pins.

A flat plate shaped heat transfer member 25 is secured on the upper surface of the removable mold member 9. The heat transfer member 25 contacts, at an entire lower surface thereof, intimately with the upper surface of the removable mold member 9. The heat transfer member 25 is provided on its upper surface with a circular recess 27. The heat transfer member 25 is also provided with a central aperture 29 extending therethrough from the upper end to the lower end. This aperture communicates with the through gate 21.

A reference numeral 31 designates a tube shaped heater device. The heater device 31 is attached to the upper surface of the heat transfer member 25. The heater device is secured through the heat transfer member 25 on the removable mold member 9. An end (outlet end) of the heater device 31 is adapted to be fit into the recess 27 of the heat transfer member 25. Thus, the heat energy can be transferred efficiently from the heater device 31 to the heat transfer member 25.

The heater device 31 comprises a heater body 33 and heater means 35 embedded within the heater body 33. The central portion of the heater body 33 is provided with an aperture 37 extending therethrough from the upper end to the lower end thereof. This aperture 37 communicates with the aperture 29 of the heat transfer member 25. Aperture 37 may be surrounded by the heater means. The heater device 31 is adapted to be used only for the mold body 5. In other words, the heater means 35 of the heater device 31 is adapted to heat the mold body 5 to melt a compound body P, and to keep the compound body P in an optimal molten state for changing into an article S, or solidifying the compound body P in the cavity 23.

As can be seen from the above, the aperture 37 is adapted to communicate with the cavity 23 through the aperture 29 and the gate 21. The heater device 31 is surrounded by a cover 39 formed by perforated metal.

A block shaped connecting member 41 is attached to the other end (inlet end) of the heater device 31. The connecting member 41 is secured to the removable molding member 9 through the heater device 31 and the heat transfer member 25. The connecting member 9 has an inlet hopper 43 for introducing the compound body P into the mold body 5. The inlet hopper is adapted to communicate with the aperture 37 of the heater device 31. The lower end portion of the hopper is reduced in its inner diameter to that of the aperture 37.

The opposite side surfaces of the connecting member 41 may also be provided with a plurality of heat dissipation fins 45, respectively.

The connecting member 41 is provided with a pair of cooling fans 47 to blow air flow against the fins 45 to decrease the temperature of the device.

Figure 3:
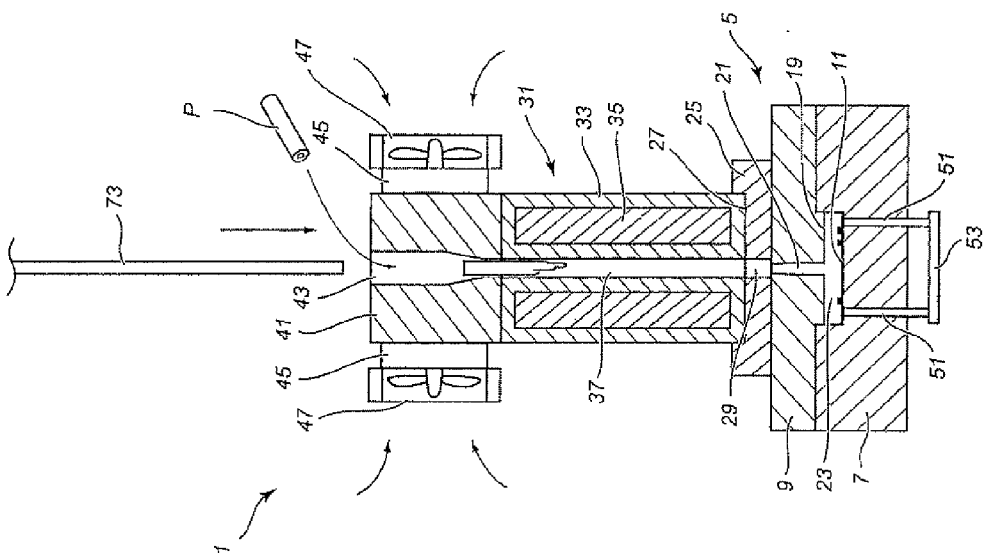
FIG. 3 is a cross sectional view of the molding device of FIG. 1.
Figure 5:
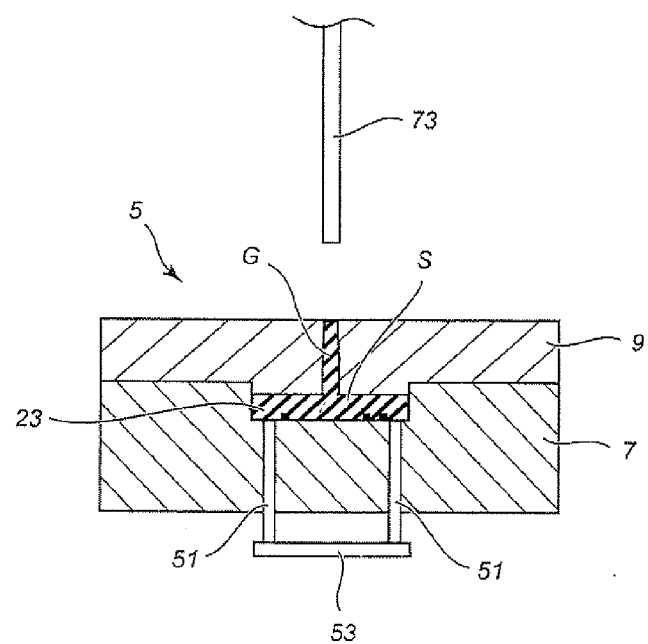
Figure 6:
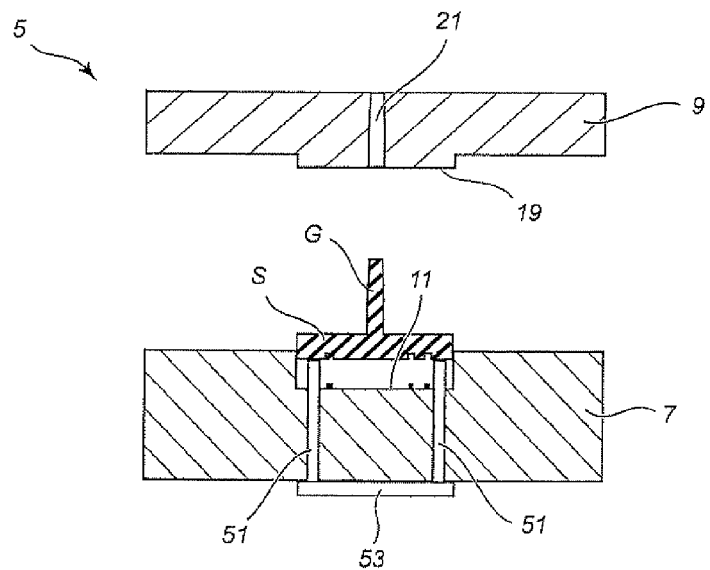

A plurality of (two in FIG. 3) ejector pins, extending through the stationary molding member 7 toward the upper ends thereof, are to be abut against the lower surface of an article S. The lower ends of the ejector pins are connected together by means of an ejector plate 53. The ejector plate 53, together with the ejector pins 51, may be adapted to be ascended or descended by means of the actuator device (not shown).

The particular arrangement of the injection molding apparatus 3 will now be described with reference to the attached drawings.

A reference numeral 61 designates a platform, on the upper surface of which is provided with a fixing member 63 for securing the molding device 1.

An upwardly extending support column 67 is secured on the side portion of the platform 61. The upper end portion of the column 67 is provided with a head portion 71. The head portion 71 can be shifted in the vertical direction, and it can also be secured in any desired position.

Figure 2:
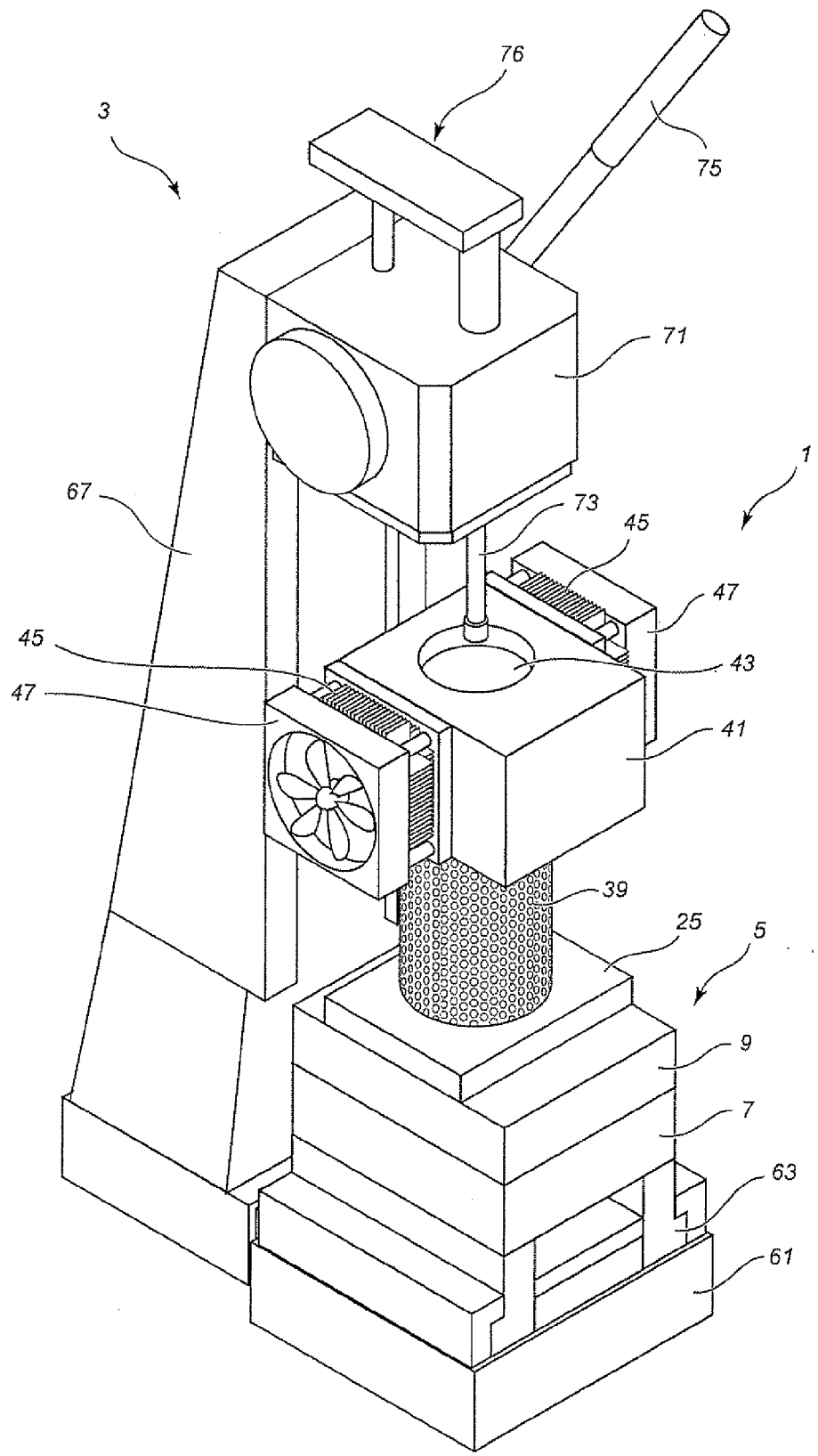
FIG. 2 is a perspective views illustrating a molding apparatus to which the device of the present invention is to be equipped.
Figure 4:
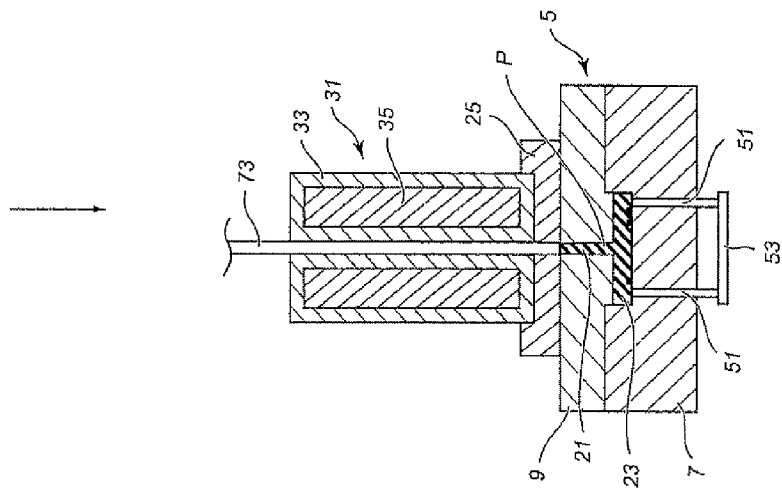
FIGS. 4, 5, and 6 are the illustration showing the mode of molding operation.

The head portion 71 may be provided with a pusher shaft 73 and a lever 75 being connected to the shaft 73 through a connecting member 76. The head portion 71 is of a hand-operated system in which upon pushing the lever 75 downwardly (i.e. the lever 75 is rotated in the clockwise direction in FIG. 2), the pusher shaft 73 is caused to be descended. Further, the lever may be urged in the counterclockwise direction in FIG. 2 by means of the force applied by the spring (not shown) so that upon released the lever 75, it raise to its original position and the pusher shaft 73 is ascended upwardly.

The above mentioned pusher shaft 73, lever 75, and connecting member 76 forms means for urging the compound body P into the mold cavity 23.

The operation of the injection molding apparatus 3 will now be described with reference to the attached drawings.

Upon closed the molding device 1, the cavity 23 is defined between the recess 11 of the stationary molding member 7 and the protrusion 19 of the removable mold member 9. Then, pushed the operating switch (not shown) of the device 1, the heater 35 and the fan 47 are energized.

The heater means 35 works to produce a predetermined amount of heat energy, and thus produced heat energy propagates to the molding members 7, 9 to heat the cavity 23 defined therebetween.

The solidified, compound body P is then introduced through the inlet hopper 43.

The amount of the compound body P is set to the same volume as that of the gate 21 and the cavity 23, i.e. to the amount required for producing one article. Thus introduced compound body P may be melted within the aperture 37 of the heater device 31.

The output of the heater means 35 is set or controlled preliminary to make the compound body P to be delivered into the cavity 23 in a molten state suitable for the injection molding process. In other words, conditions such as temperature and the viscosity of the compound body P in the aperture 37 are suitable for the injection molding process.

Upon descended the pusher shaft 73 in such conditions, the molten, compound body P is injected by the shaft 73 into the gate 21 and the cavity 23. The compound body P is then set up to the article S and the gate G.

The heat energy produced by the heater means 35 propagates through the heat transfer member 25 to the molding members 7, 9 to heat the mold body 5 so that the interior surface of the gate 21 and the cavity 23 can also be heated to the predetermined temperature. Thus produced heat energy may also be transferred to the compound body P delivered into the cavity 23. In this connection, the reduction of the flow ability of the compound body P or the solidification of the compound body P before filling the cavity 23 completely therewith can be avoided. There are no obstructions in forming the article S. The temperature appropriate for the injection molding of the compound body P can be maintained without controlling the output of the heater means 5.

Further, although the heater means 5 is kept in operation during the injection of the compound body P into the cavity 23, the compound body P can be solidified in a short time to make the article S, because of the temperature difference between the aperture 37 and the cavity 23.

Upon solidified the article, the mold body is opened and the ejector pins 51 are ascended by the actuator to push the article S out of the recess 11.

In the above mentioned operation of the injection molding apparatus 3, the heat energy can be dissipated from the connecting member 41 through the fins 45, and the connecting member 41 can also be cooled by means of fans 47 so that the extraordinary high temperature of the connecting member 41 due to the heat energy transferred from the heater device 31 can be avoided. Thus the accumulation of the compound body P melted within the connecting member 41 can also be avoided.

As can be seen from the above, the only thing to be effected in the production of the article is to switch on the heater means 35. In other words, there is no need to control precisely the temperature of the heater device and/or the mold body, and there is no need to provide a plurality of temperature sensors or a control device for controlling the output of the heater means of the heater device. In conclusion, the cost effective injection molding apparatus can be provided in accordance with the present invention.

It is to be appreciated that the invention has been described hereinabove with reference to certain embodiment of the invention but that various additions, deletions, alterations and modifications may be made to the embodiment without departing from the intended sprit and scope of the invention.

For example, although in the embodiment as mentioned above a head portion 71 of a hand-operated type is provided, the head portion 71 can be made automatic operating type.

Although in the embodiment as mentioned above a heat dissipation fins 45 are provided on the opposite side surfaces of the connecting member 41 respectively, the fins 45 can be provided on all side surfaces or three side surfaces of the connecting member 41, or the only one side surface. No fins can also be provided.

The number of fans 47 is not limited to two, and it can conveniently be changed.

Although in the embodiment as mentioned above the heater means 35 is kept on its operation during the injection of the compound body P into the cavity 23, the heater means 35 can be halted temporarily because of the condition such as the kind of the compound body to be molded, the shape of the article to be molded, or the size of the mold body.

Industrial Applicability

The injection molding apparatus of the present invention can be used in the manufacturing industries producing articles by injection molding the compound body.

Explanation of the reference numerals

| | | | |
|---|---|---|---|
| 1 | molding device | 3 | injection molding apparatus |
| 5 | mold body | 7 | stationary mold member |
| 9 | removable mold member | 11 | recess |
| 17 | registration pins | 19 | protrusion |
| 21 | gate | 23 | cavity |
| 25 | heat transfer member | 27 | circular recess |
| 29 | aperture | 31 | heater device |
| 33 | heater body | 35 | heater means |
| 39 | cover | 41 | connecting member |
| 43 | inlet hopper | 45 | heat dissipation fins |
| 47 | fan | 51 | ejector pin |
| 53 | ejector plate | 61 | platform |
| 63 | fixing member | 67 | support column |
| 71 | head portion | 73 | pusher shaft |
| 75 | lever | 76 | connecting member |

-continued

Explanation of the reference numerals

| | | | |
|---|---|---|---|
| P | compound body | G | gate |
| S | article | | |

The invention claimed is:

1. A molding apparatus comprising:
a molding device including:
   a mold body having a stationary molding member and a removable molding member defining a gate and a mold cavity between the stationary molding member and the removable molding member;
   a tube shaped heater device including a heater unit, a first end of the heater device being connected to the mold body so as to communicate with the gate; and
   a connecting member connected to a second end of the heater device including an inlet hopper for introducing compound material into the heater device;
   wherein the heater device and the mold body are configured, upon receiving heat from the heating unit, to melt the compound material in the heater device and to heat the mold body, and
a pusher shaft configured to press all of the compound material in the heater device and inject all the compound material into the mold cavity, the pusher shaft also being configured to close the gate.

2. The molding apparatus as claimed in claim 1, wherein a heat transfer member is interposed between the tube shaped heater device and the mold body.

3. The molding apparatus as claimed in claim 1 further comprising:
a cooling unit configured to cool the connecting member.

4. The molding apparatus as claimed in claim 2 further comprising:
a cooling unit configured to cool the connecting member.

5. The molding apparatus as claimed in claim 3, wherein the cooling unit includes a plurality of heat dissipation fins attached to the connecting member and one or more fans attached to the heat dissipation fins.

6. The molding apparatus as claimed in claim 4, wherein the cooling unit includes a plurality of heat dissipation fins attached to the connecting member and one or more fans attached to the heat dissipation fins.

7. The molding apparatus as claimed in claim 1 further comprising:
a plurality of ejector pins that pass through the stationary molding member,
the ejector pins being configured to push a finished article out of the mold cavity.

8. The molding apparatus as claimed in claim 1, wherein the gate has a constant cylindrical cross-section.

9. The molding apparatus as claimed in claim 1, wherein a finished article shape is based on the combined shape of the gate and the mold cavity.

10. The molding apparatus as claimed in claim 1, wherein the compound material is an appropriate amount to make a single finished article.

\* \* \* \* \*